United States Patent [19]

Knott, II

[11] 4,347,337

[45] Aug. 31, 1982

[54] ETHYLENE-VINYL ALCOHOL WITH PHENOL ADDITIVE

[75] Inventor: Jack E. Knott, II, Appleton, Wis.

[73] Assignee: American Can Company, Greenwich, Conn.

[21] Appl. No.: 250,844

[22] Filed: Apr. 3, 1981

Related U.S. Application Data

[62] Division of Ser. No. 130,229, Mar. 14, 1980, Pat. No. 4,289,830.

[51] Int. Cl.$^3$ .......................... C08F 8/00; C08F 16/06; C08K 5/13
[52] U.S. Cl. ...................................... 525/60; 524/425; 524/287; 524/323; 525/61; 524/91; 524/291; 524/336
[58] Field of Search ....................... 525/61, 1, 5, 6, 56, 525/62, 60; 260/45.95 R, 45.95 H, 45.8 NT

[56] References Cited

U.S. PATENT DOCUMENTS

| | | | |
|---|---|---|---|
| 3,624,062 | 11/1971 | Dunbar | 525/61 |
| 3,642,690 | 2/1972 | Mills | 260/45.7 R |
| 3,821,167 | 6/1974 | Asano | 525/61 |
| 4,080,361 | 3/1978 | Wang et al. | 260/45.95 R |
| 4,221,700 | 9/1980 | Minagawa et al. | 260/45.8 R |

*Primary Examiner*—Allan Lieberman

[57] ABSTRACT

The addition of a small amount of a phenol to an ethylene-vinyl alcohol oxygen-barrier layer significantly improves oxygen impermeability under high humidity conditions.

1 Claim, 1 Drawing Figure

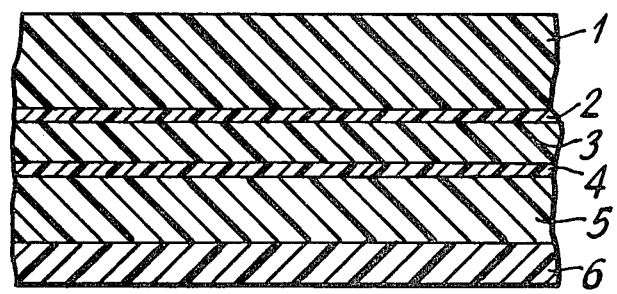

ETHYLENE-VINYL ALCOHOL WITH PHENOL ADDITIVE

This application is a division of application Ser. No. 130,229, filed Mar. 14, 1980, now issued as U.S. Pat. No. 4,289,830.

BACKGROUND

Ethylene-vinyl alcohol (EVOH) is the result of hydrolysis of ethylene-vinyl acetate copolymer. Substantially fully hydrolyzed EVOH, that is with less than 2 or 3 mole percent remaining vinyl acetate, is an extrusible polymer which displays remarkable gas-barrier properties. The gas-barrier quality of EVOH is dependent upon the moisture content. Above a water content of about 7 or 8 percent, the oxygen permeability of EVOH rapidly increases.

Because EVOH is a relatively expensive, moisture sensitive polymer, often it is employed as a thin barrier layer within a multi-layer polymeric film or sheet structure. The structural layers usually are less expensive, moisture resistant polymers. Multi-layer films or sheets suitable for food packaging often have polyolefin or nylon structural layers on each side of the gas-barrier layer and for some applications have a heat-sealable surface layer of a low melting temperature material such as Surlyn ionomer, ethylene-vinyl acetate (EVA), ethylene-acrylic acid (EAA), or low-density polyethylene (LDPE). Because of the cost, dilution by blending EVOH with less expensive polymers such as polyolefins is desirable, but blending EVOH with other polymers usually increases the oxygen permeability.

SUMMARY

It has been found that the incorporation of relatively small quantities of phenols in EVOH produces unexpectedly desirable results. The addition of about 1 percent of a phenol, particularly a phenol substituted in the ortho position, reduces the oxygen permeability at 100 percent relative humidity to as little as one half that of pure EVOH. Since many products such as foods are moist and since package storage conditions can be damp, the ability to preserve the good barrier qualities of EVOH under high humidity conditions is highly desirable. The addition of about 1 percent of a phenol allows blending of EVOH with an inexpensive polyolefin such as polyethylene with no less of oxygen-barrier quantity when compared with EVOH alone, whereas the blending of an equal amount of polyolefin with EVOH not containing a phenol caused a reduction in barrier quality. A further advantage of blending a polyolefin with EVOH containing a phenol is that the blend has a lower water vapor transmission rate than does pure EVOH alone, thereby reducing the moisture sensitivity of the blend.

Many products, particularly meats, are degraded by ultraviolet light (UV). Some phenols act as UV absorbers and are useful as UV barriers when added to polymers. When phenols are added to EVOH, the result is an improved gas-barrier at high humidities in combination with an effective UV barrier. A further advantage of the addition of a UV absorbing phenol with EVOH is that measurement of UV absorption provides a convenient means for monitoring the thickness and uniformity of the thin EVOH barrier layer in a multi-layer coextrusion process.

The mechanism by which phenols appear to preserve the gas barrier quality of EVOH in the presence of water is occupation of hydrogen bonding sites on the EVOH molecules. EVOH is a glassy polymer when dry. Water injures that glassy character of EVOH and reduces the glass transition temperature ($T_G$) of the polymer. When the glass transition temperature falls below the actual temperature, the polymer loses its structural character. Phenols appear to link with hydrogen bonding sites of the EVOH polymer thereby to exclude water.

DESCRIPTION OF PREFERRED EMBODIMENTS

The drawing depicts a cross-section of a multi-layer film structure in accordance with the present invention.

A number of different ortho-substituted phenols having melting points below about 185° C. and boiling points above about 125° C. were compounded with EVAL brand extrusible EVOH, sold by Kuraray Co. Ltd. of Japan. The phenol represented about 1 percent by weight of EVOH. The thus modified EVOH polymers were extruded into film. Among the ortho-substituted phenols were 2-hydroxy-4-octoxybenzophenone, 2-hydroxy-4 methoxybenzophenone, 2,4-dihydroxybenzophenone, octyl 3-(3',5'-di ti-butyl-4'-hydroxy) phenyl propionate, 2(2'-hydroxy-3',5' di-tert-amyl) phenyl-benzotriazole, tertiary butyl salicylate. Film was also extruded from EVOH having 10 percent by weight of a blend of 9 parts LDPE and 1 part 2-hydroxy-4 octoxybenzophenone.

In Table I, the oxygen permeability of each test film was measured at 73° F. by mounting the film to be measured in standard test apparatus with a wet pad on each side of the film to assure 100 percent relative humidity. Under these test conditions, the oxygen permeability of a film of pure EVOH (Example 10) averaged 750·cc·mil/m²·day·atm. Examples 1 through 8 each employ 1 percent by weight of a phenol added to the EVOH. The oxygen permeability is also reported as a percentage of that of EVOH alone.

TABLE I

| Example | Phenol | $O_2$ Permeability (100% R.H.) measured | compared with EVOH alone | Melting Point °C. | Boiling Point °C. |
|---|---|---|---|---|---|
| 1 | 2-hydroxy-4 octoxybenzophenone | 500 | 66% | 45° | 160° |
| 2 | 2-hydroxy-4 methoxybenzophenone | 475 | 63% | 64° | 155° |
| 3 | 2,4 dihydroxybenzophenone | 460 | 61% | 146° | 160° |
| 4 | octyl 3-(3',5'-di t-butyl-4'-hydroxy) phenyl propionate | 320 | 42% | 50° | 162°–218° |
| 5 | 2(2'-hydroxy-3',5' di-tert-amyl) phenyl-benzotriazole | 350 | 46% | 81° | * |
| 6 | Tertiary butyl salicylate | 480 | 64% | * | * |
| 7 | t-butylhydroquinone | 680 | 94% | 128° | * |
| 8 | 90 parts EVOH, 1 part phenol of Example 1, 9 parts LDPE | 570 | 76% | | |
| 9 | 90 parts EVOH, 10 parts LDPE | | | | |

TABLE I-continued

| Example | Phenol | O$_2$ Permeability (100% R.H.) | | Melting Point °C. | Boiling Point °C. |
|---|---|---|---|---|---|
| | | measured | compared with EVOH alone | | |
| | (no phenol) | 870 | 115% | | |
| 10 | 100 parts EVOH (no phenol) | 750 | 100% | | |

*not known

From Table I, it can be concluded that the addition of a relatively small amount (1 percent) of a phenol produces a reduction of as much as 50 percent in oxygen permeability over that of EVOH alone at high humidity conditions. The phenol of Example 4 is sold under the name Irganox and the phenol of Example 5 is sold under the name Tinuvin, both by Ciba Geigy Corporation of Ardsley, N.Y., as antioxidants for addition to polyolefins and the like. A material comprising 9 parts low-density polyethylene and 1 part of the phenol of Example 1 is sold under the name Ampacet 10057 by the Ampacet Co. of Mount Vernon, N.Y., as a UV absorber for addition to polyolefins and the like. This commercial material was used in Example 8 and demonstrated effective UV absorbance for extending shelf-life of packaged meat. The phenols of Examples 2 and 3 are also effective UV absorbants.

Comparison of Example 8 with Example 9 shows that even though diluted with LDPE, the blend containing phenol (Ampacet 10057) had but 76 percent of the oxygen permeability of EVOH alone, whereas dilution of EVOH with a similar amount of LDPE lacking the phenol caused a 15 percent increase in oxygen permeability over EVOH alone.

The improvement of oxygen-barrier quality of EVOH at high-humidity conditions is not dependent upon the quantity of phenol present. Testing with the amount of phenol as the variable demonstrated a lack of criticality and that 1 percent phenol by weight is an adequate amount to achieve the desired oxygen-barrier improvement and is adequate for the UV absorption purpose.

Suitable phenols must be in a liquid state at the processing temperature and pressure conditions for extrusion of EVOH. We have found that suitable phenols should have a melting point below about 185° C. and an atmospheric pressure boiling point higher than about 125° C. for compounding with an extrusible EVOH. The phenol can be compounded with the EVOH by physical mixing with EVOH pellets, melting and extruding the mix, and chopping the solid extrudate into pellets for subsequent melt processing as by extrusion or coextrusion with other polymers as a multi-layer film, tube, or sheet.

Referring to FIG. 1, an exemplary multi-layer film suitable for meat packaging is illustrated in the drawing. The film comprises an outside structural layer 1 of polyolefin, an adhesive layer 2 of a modified polyolefin, a barrier layer 3 of EVOH containing about 1 percent phenol, a second adhesive layer 4, a second structural layer 5 of polyolefin, and a heat-sealable inside layer 6 of ethylene-vinyl acetate (EVA). The film is made by coextrusion. Other exemplary films for food packaging substitute nylon for the outer structural layer of polyolefin and modified polyolefin adhesive. The heat-sealable inner layer may be ethylene-acrylic acid (EAA), an ionomer such as du Pont's Surlyn, or low-density polyethylene.

I claim:

1. A method for decreasing the gas permeability in the presence of moisture of an ethylene-vinyl alcohol polymer gas-barrier layer comprising the step of adding at least about one percent of an ortho-substituted phenol having a melting point below about 185° C. and a boiling point above about 125° C. to the polymer before forming the barrier layer.

* * * * *